US012036576B2

(12) United States Patent
Burmester et al.

(10) Patent No.: US 12,036,576 B2
(45) Date of Patent: Jul. 16, 2024

(54) SLOT NOZZLE FOR ADHESIVE APPLICATORS

(71) Applicant: NORDSON CORPORATION, Westlake, OH (US)

(72) Inventors: Thomas Burmester, Bleckede (DE); Hubert Kufner, Lüneburg (DE)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 18/164,025

(22) Filed: Feb. 3, 2023

(65) Prior Publication Data

US 2023/0173528 A1 Jun. 8, 2023

Related U.S. Application Data

(62) Division of application No. 17/245,891, filed on Apr. 30, 2021, now Pat. No. 11,583,887.

(51) Int. Cl.
*B05C 5/02* (2006.01)

(52) U.S. Cl.
CPC .................................. *B05C 5/0262* (2013.01)

(58) Field of Classification Search
None
See application file for complete search history.

(56) References Cited

U.S. PATENT DOCUMENTS

| | | | |
|---|---|---|---|
| 5,354,378 | A | 10/1994 | Hauser et al. |
| 5,409,733 | A | 4/1995 | Boger et al. |
| 5,418,009 | A | 5/1995 | Raterman et al. |
| 5,421,921 | A | 6/1995 | Gill et al. |
| 5,423,935 | A | 6/1995 | Benecke et al. |
| 5,429,840 | A | 7/1995 | Raterman et al. |
| 5,733,597 | A | 3/1998 | Schmitkons et al. |
| 6,368,409 | B1 | 4/2002 | Borsuk et al. |
| 6,540,831 | B1 | 4/2003 | Craine et al. |
| 6,676,038 | B2 | 1/2004 | Gressett, Jr. et al. |
| D550,261 | S | 9/2007 | Bondeson et al. |

(Continued)

FOREIGN PATENT DOCUMENTS

| | | |
|---|---|---|
| JP | 2001-149842 A | 6/2001 |

OTHER PUBLICATIONS

European search report Mailed on Oct. 13, 2022 for EP Application No. 22169471.

*Primary Examiner* — Jethro M. Pence
(74) *Attorney, Agent, or Firm* — BakerHostetler

(57) ABSTRACT

A nozzle assembly includes a first body having an upper and an inner surface; a first channel in the first body to receive a material; a second body having an upper and an inner surface; a second channel in the second body, in liquid communication with the first channel, and configured to receive the material from the first channel; a material outlet defined by the first and second bodies configured to discharge the material; a material inlet on the upper surface of the first body, in liquid communication with the first channel, and configured to receive the material into the nozzle assembly; and an upper lip extending from the first body toward the second body and partly defined by the upper surface of the first body. The upper lip includes a lip surface opposite the upper surface of the first body. The upper surface of the second body is configured to contact the lip surface of the upper lip.

18 Claims, 14 Drawing Sheets

(56) References Cited

U.S. PATENT DOCUMENTS

| | | | | |
|---|---|---|---|---|
| 7,798,434 | B2 * | 9/2010 | Bondeson | B05B 7/0861 239/296 |
| 8,210,398 | B2 * | 7/2012 | Bondeson | B05C 11/1042 222/146.2 |
| 8,399,053 | B2 * | 3/2013 | Bondeson | B05B 7/0861 118/313 |
| 8,535,756 | B2 * | 9/2013 | Bondeson | B05B 7/0861 118/313 |
| 2002/0018856 | A1 | 2/2002 | Kufner et al. | |
| 2008/0145530 | A1 | 6/2008 | Bondeson et al. | |
| 2009/0258138 | A1 | 10/2009 | Burmester et al. | |
| 2013/0011552 | A1 | 1/2013 | Bondeson et al. | |

* cited by examiner

SLOT NOZZLE FOR ADHESIVE APPLICATORS

CROSS-REFERENCE TO RELATED APPLICATION

This application is a divisional of U.S. patent application Ser. No. 17/245,891, filed Apr. 30, 2021 (now U.S. Pat. No. 11,583,887 issued Feb. 21, 2023), which is incorporated by reference herein in its entirety.

TECHNICAL FIELD

The present disclosure relates to application assemblies for dispensing flowable materials onto substrates, and more particularly, to an improved nozzle assembly for use with application assemblies.

BACKGROUND

Various applicator systems have been used in the past for applying patterns of viscous liquid material, such as hot melt adhesives, onto a moving substrate. In the production of disposable diapers, incontinence pads and similar articles, for example, hot melt adhesive applicator systems have been developed for applying a laminating or bonding layer of hot melt thermoplastic adhesive between a nonwoven fibrous layer and a thin polyethylene backsheet. In some existing systems, the hot melt adhesive applicator system is mounted above a moving polyethylene backsheet layer and applies a uniform pattern of hot melt adhesive material across the upper surface width of the backsheet substrate. Downstream of the applicator system, a nonwoven layer is laminated to the polyethylene layer through a pressure nip and then further processed into a final usable product.

Application of the material onto the various substrates can be controlled to have desired parameters. Such control can be achieved by adjusting the dispensing nozzle through which the material is discharged towards the substrate. During adjustment of the nozzle, components of the nozzle can shift with respect to other components of the nozzle or with respect to other components of the applicator assembly. Such shifts can result in undesired effects on the discharged material and/or on the discharging process.

Therefore, there is a need for an improved nozzle assembly that can be adjusted without resulting in undesirable effects on the dispensed material.

SUMMARY

The foregoing needs are met by various embodiments of nozzle assemblies disclosed. According to one aspect of this disclosure, a nozzle assembly for use with an applicator for applying a material to a substrate includes a first body having an upper surface and an inner surface angularly offset from the upper surface; a first channel extending through the first body, the first channel configured to receive the material therein; a second body having an upper surface and an inner surface angularly offset from the upper surface; a second channel extending through the second body, the second channel being in liquid communication with the first channel and configured to receive the material therein from the first channel; a material outlet defined by the first body and the second body, the material outlet configured to discharge the material therethrough from the nozzle assembly; a material inlet defined on the upper surface of the first body, the material inlet being in liquid communication with the first channel and being configured to receive the material therethrough into the nozzle assembly; and an upper lip extending from the first body toward the second body, the upper lip being partly defined by the upper surface of the first body, and the upper lip including a lip surface opposite the upper surface of the first body. The upper surface of the second body is configured to contact the lip surface of the upper lip of the first body.

According to another aspect of the disclosure, an applicator assembly for dispensing a material onto a substrate includes a housing; a dispensing assembly configured to receive the material therein; and a nozzle assembly configured to receive the material from the dispensing assembly at a material inlet and to discharge the material out of the nozzle assembly through a material outlet. The nozzle assembly includes a first body having an upper surface and an inner surface angularly offset from the upper surface; a first channel extending through the first body, the first channel configured to receive the material therein; a second body having an upper surface and an inner surface angularly offset from the upper surface; a second channel extending through the second body, the second channel being in liquid communication with the first channel and configured to receive the material therein from the first channel; and an upper lip extending from the first body toward the second body, the upper lip being partly defined by the upper surface of the first body, and the upper lip including a lip surface opposite the upper surface of the first body. The material outlet is defined by the first body and the second body. The material inlet is defined on the upper surface of the first body and is in liquid communication with the first channel. The upper surface of the second body is configured to contact the lip surface of the upper lip of the first body. The housing includes a first wall extending therefrom and a second wall extending therefrom spaced from the first wall, the housing defining a space between the first and second walls. The nozzle assembly is configured to be received in the space defined between the first and second walls.

BRIEF DESCRIPTION OF THE DRAWINGS

The present application is further understood when read in conjunction with the appended drawings. For the purpose of illustrating the subject matter, there are shown in the drawings exemplary aspects of the subject matter; however, the presently disclosed subject matter is not limited to the specific methods, devices, and systems disclosed. In the drawings.

Aspects of the disclosure will now be described in detail with reference to the drawings, wherein like reference numbers refer to like elements throughout, unless specified otherwise.

DETAILED DESCRIPTION OF ILLUSTRATIVE EMBODIMENTS

Figure 1:
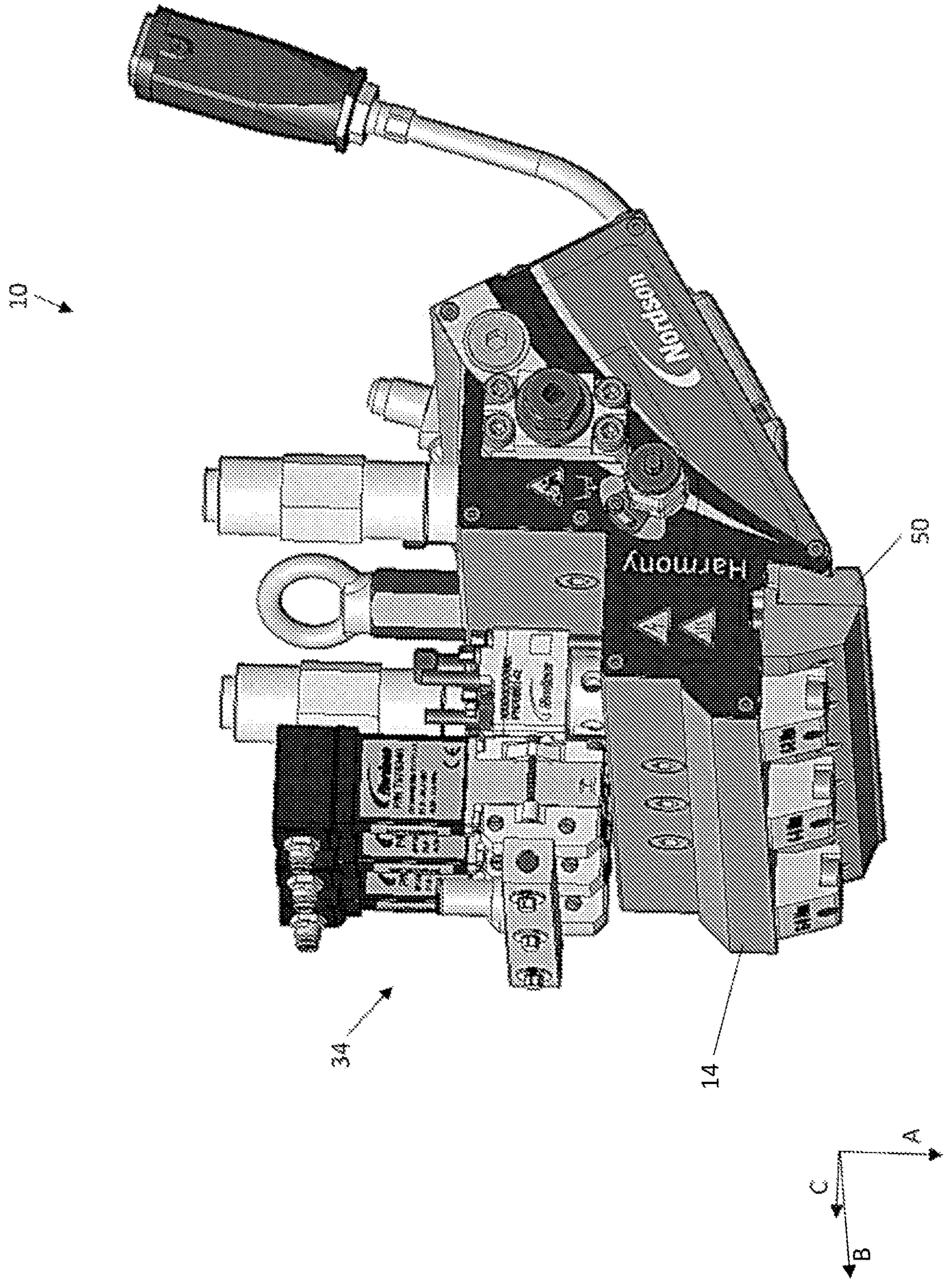
FIG. 1 depicts a perspective view of an applicator assembly according to an aspect of this disclosure.
Figure 2:
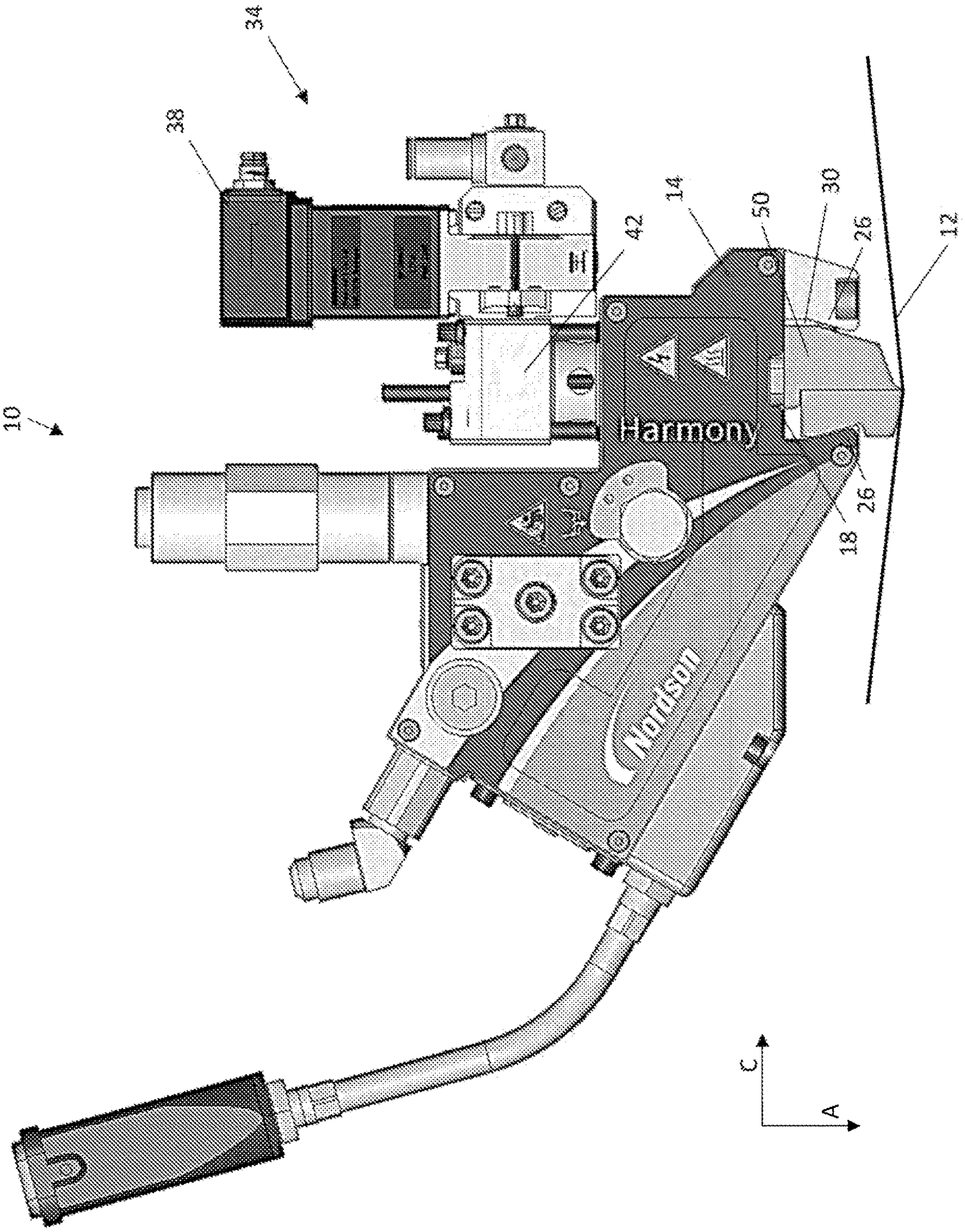
FIG. 2 depicts a side view of the applicator assembly of FIG. 1.

To manufacture certain consumables (e.g., diapers, sanitary napkins, pads, other hygiene products, and/or the like), one or more flowable materials can be deposited onto a substrate to form portions of each consumable. Referring to FIGS. 1 and 2, flowable material can be processed, heated, extruded, and/or the like onto a substrate 12 by an applicator assembly 10. The applicator assembly 10 may include a gun body or housing 14 that is configured to receive therein or thereon one or more dispensing assemblies 34 and one or more nozzle assemblies 50. The applicator assembly 10 may include a heater 11 (shown in phantom in FIGS. 10A and 10B) to transfer heat to the material flowing through the applicator assembly 10. The applicator assembly 10 can include a controller (not shown) for controlling operation of one or more of the components of the applicator assembly 10. Each dispensing assembly 34 may include a dispensing head 42 that is configured to receive the material from a material source (not shown) and to dispense the material into a nozzle assembly 50 according to predetermined dispensing parameters. The dispensing by the dispensing head 42 can be controlled by a control assembly 38 operably connected to the dispensing head 42. The control assembly 38 may include a solenoid controller.

The material dispensed from one or more of the dispensing assemblies 34 can be received into a connected nozzle assembly 50. The material can then be moved through the nozzle assembly 50 and dispensed onto the substrate 12. The substrate 12 can be a sheet, a web, a strand, and/or the like. In some aspects, the substrate 12 can be configured to move relative to the nozzle assembly 50 as the material is being deposited thereon. In some aspects, the substrate 12 can be in contact with at least a portion of the nozzle assembly 50 while the material is being deposited.

For purposes of this disclosure, reference will be made to various axes and directions with respect to the described components. It should be appreciated that the described coordinates are for reference purposes only, and that this disclosure is not limited to the particular axes, directions, or planes described. A first axis A is defined as extending substantially along the direction of flow of the material as the material moves through the nozzle assembly 50. In some aspects, the flow direction, and thus the first axis A, may be substantially vertical with respect to ground. A second axis B extends orthogonal to the first axis A. A third axis C extends orthogonal to the first axis A and the second axis B. Thus, a plane defined by the first axis A and the second axis B will be orthogonal to the third axis C; a plane defined by the first axis A and the third axis C will be orthogonal to the second axis B; and a plane defined by the second axis B and the third axis C will be orthogonal to the first axis A. For purposes of this disclosure, reference to one or more directions alone the first, second, and/or third axes A, B, and C will include both opposing directions unless indicated otherwise. That is, for example, reference to a direction along the first axis A will include a direction along the first axis A from a first point toward a second point and also a direction from the second point toward the first point. Furthermore, reference to directions along the one or more of the first, second, and third axes A, B, and C can include directions that overlay the reference axis and directions that are offset from the references axis but that are substantially parallel to the reference axis. For example, reference to a direction along the first axis A can include a direction that overlays the first axis A or to a direction that is offset and parallel to the first axis A.

Referring to FIGS. 4-8, a nozzle assembly 50 is depicted having a material inlet 144 and a material outlet 62. The nozzle assembly 50 is configured to receive the material (e.g., adhesive, melted thermoplastic, another non-woven liquid, semi-liquid material, and/or the like) therein at the one or more material inlets 144 from the one or more dispensing assemblies 34. The material can be moved through the nozzle assembly 50 along the first axis A in a dispensing direction and dispensed therefrom through the material outlet 62. The nozzle assembly 50 may be configured to be removably attached to the housing 14, such that the material can be dispensed from the dispensing assembly 34 towards and into the nozzle assembly 50. When the nozzle assembly 50 is received in or on the housing 14, the nozzle assembly 50 can receive heat from a heater 11 (see FIGS. 10A and 10B) disposed in or on the housing 14. The nozzle assembly 50 can transfer heat from the heater 11 to the material flowing therethrough to heat the material to a desired temperature and/or to maintain a desired temperature of the material as the material is being moved through the nozzle assembly 50. In some aspects, the nozzle assembly 50 can include a plurality of material inlets 144. The number of inlets 144 can correspond to a number of outlets 22 (labeled in FIG. 3) through which the material exits the housing 14. The applicator assembly 10 can include a plurality of dispensing assemblies 34, for example, arranged serially along the second axis B as shown in FIG. 1. The number of outlets 22 on the housing 14 can correspond to the number of dispensing assemblies 34. In some aspects, the number of inlets 144 on the nozzle assembly 50 can correspond to the number of outlets 22 and the number of dispensing assemblies 34. Exemplary applicator assemblies 10 can have 1, 2, 3, 10, or another suitable number of dispensing assemblies 34.

With continued reference to FIGS. 4-8, the nozzle assembly 50 includes a first body 100 and a second body 200. During operation, the first body 100 and the second body 200 can contact each other. The first body 100 includes a proximal end 104 and a distal end 108 spaced from the proximal end 104 along the first axis A. A left wall 112 defines one side of the first body 100, and a right wall 116 defines an opposite side of the first body 100. The left wall 112 is spaced from the right wall 116 along a longitudinal direction along the second axis B. Each of the left and right walls 112 and 116 extend from the proximal end 104 to the distal end 108. In some aspects, the left and right walls 112 and 116 may be parallel to each other. An upper surface 120 extends along the second axis B between the left wall 112 and the right wall 116 of the first body 100. The upper surface 120 may be substantially planar. When the nozzle assembly 50 is retained within the housing 14, the upper surface 120 may contact a dispensing surface 18 defined on the housing 14. In some aspects, one or more sealing elements 58, such as O-rings, can be disposed on the upper surface 120 such that the one or more sealing elements 58 can contact both the upper surface 120 and the dispensing surface 18 when the nozzle assembly 50 is retained within or on the housing 14.

Figure 7:
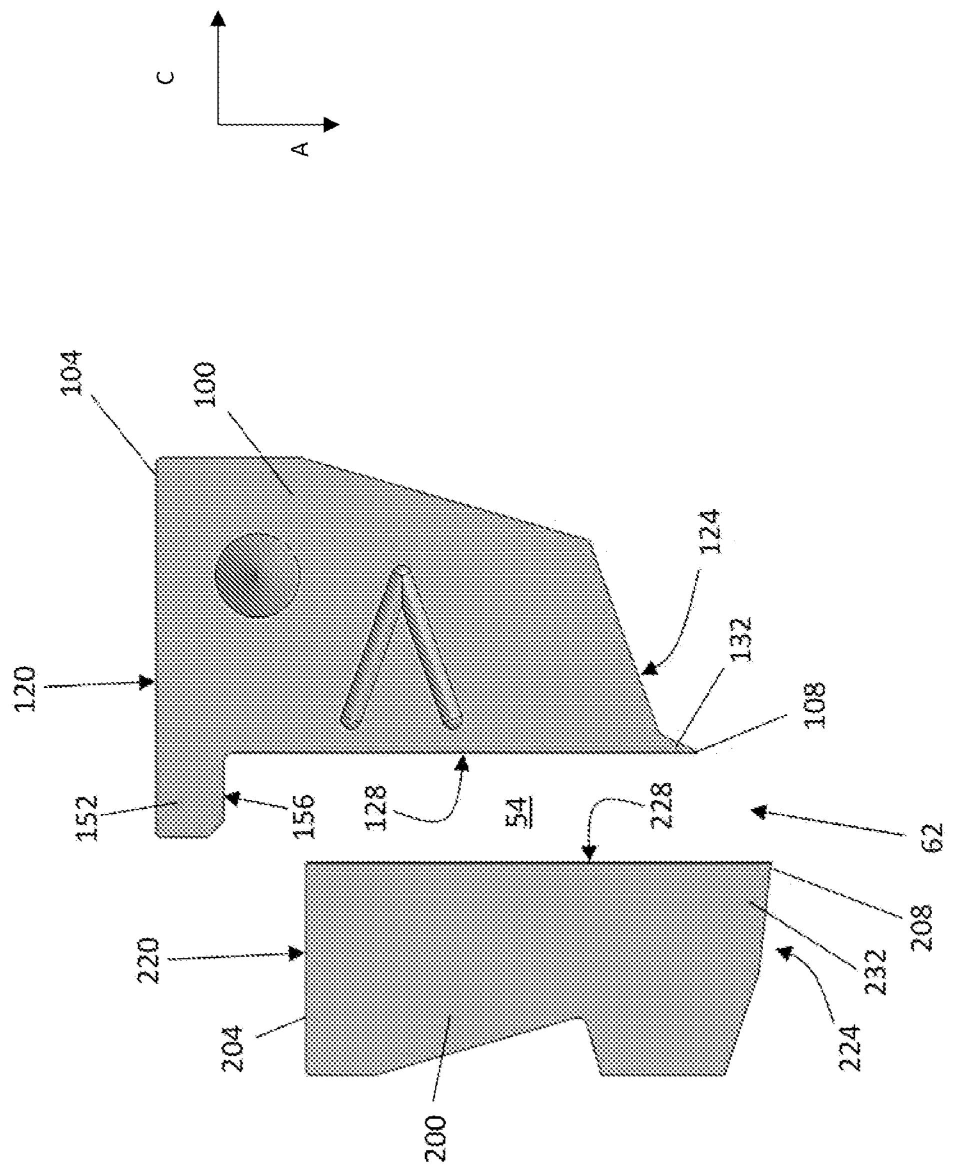
FIG. 7 depicts an exploded side view of the nozzle assembly of FIG. 4.
Figure 8:
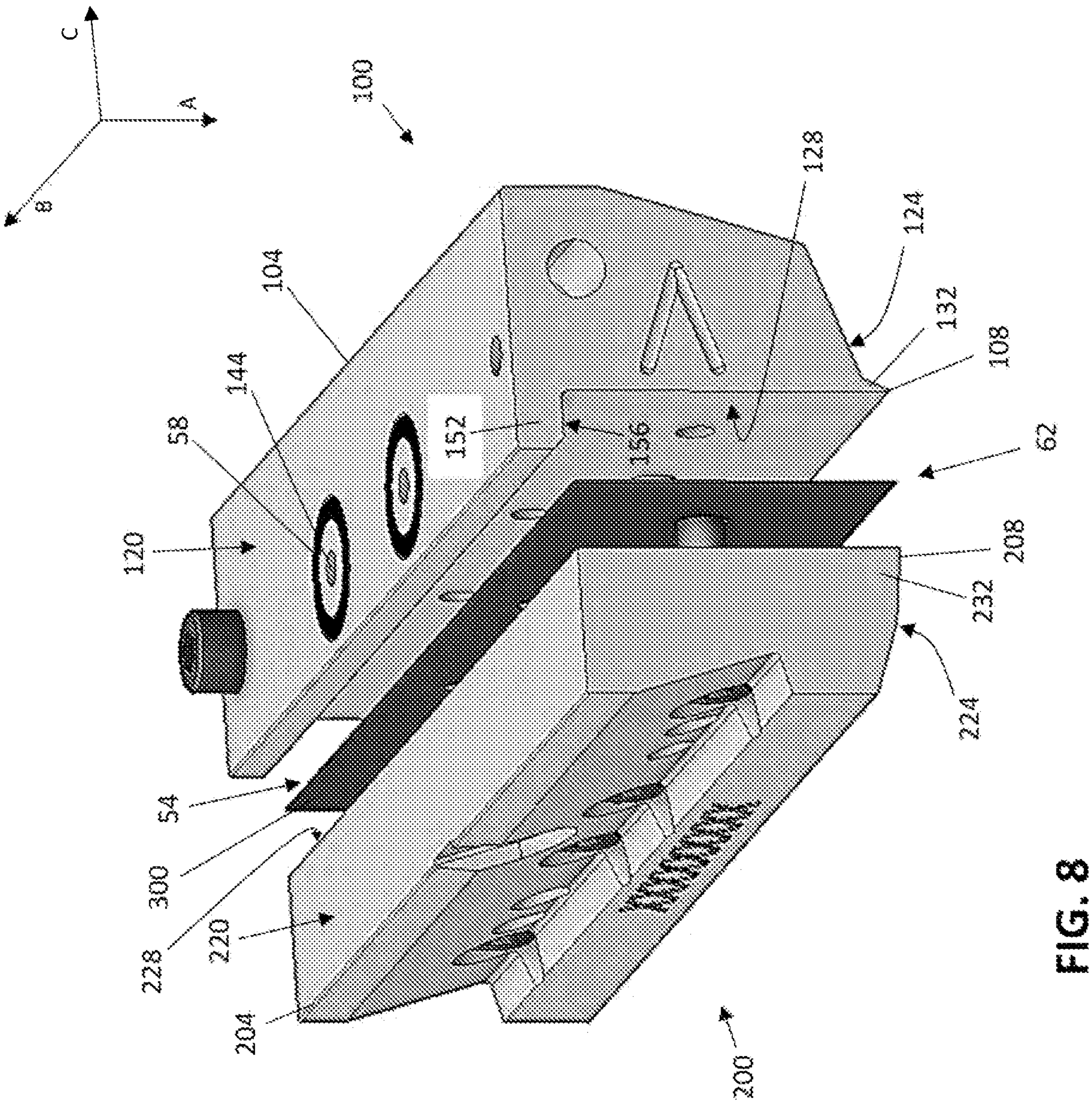
FIG. 8 depicts an exploded perspective view of a nozzle assembly according to another aspect of this disclosure.

The first body 100 includes a bottom surface 124 spaced from the upper surface 120 along the first axis A. As shown in FIG. 7, the first body 100 defines an inner surface 128 configured to receive the material thereon. The inner surface 128 and the bottom surface 124 can define a lower lip 132 at the distal end 108 of the first body 100. The lower lip 132 may have a preferred dimension and/or shape to facilitate desired rate, shape, or pattern of extrusion of the material at the outlet 62.

The first body 100 defines an upper lip 152 extending away from the inner surface 128 toward the second body 200 along a lateral direction along the third axis C. The upper lip 152 is defined, in part, by the upper surface 120 of the first body 100 and by a lip surface 156 that is opposite the upper surface 120 and is spaced from the upper surface 120 along the first axis A in the direction of the distal end 108. The lip surface 156 can extend from the inner surface 128. In some aspects, the lip surface 156 may be substantially parallel to the upper surface 120. The lip surface 156 is configured to engage with the second body 200, as will be described below.

The second body 200 is spaced from the first body along the third axis C. The second body 200 is configured to contact the first body 100. The second body 200 includes a proximal end 204 and a distal end 208 spaced from the proximal end 204 along the first axis A. A left wall 212 defines one side of the second body 200, and a right wall 216 defines an opposite side of the second body 200. The left wall 212 is spaced from the right wall 216 along a longitudinal direction along the second axis B. Each of the left and right walls 212 and 216 extend from the proximal end 204 to the distal end 208. In some aspects, the left and right walls 212 and 216 may be parallel to each other. An upper surface 220 extends along the second axis B between the left wall 212 and the right wall 216 of the second body 200. The upper surface 220 may be substantially planar. The upper surface 220 may be substantially parallel to the upper surface 120 of the first body 100. In some aspects, the upper surface 220 may be substantially parallel to the lip surface 156 of the first body 100.

The second body 200 includes a bottom surface 224 spaced from the upper surface 220 along the first axis A. As shown in FIG. 7, the second body 200 defines an inner surface 228 configured to receive the material thereon. The inner surface 228 and the bottom surface 224 can define a lower lip 232 at the distal end 208 of the second body 200. The lower lip 232 may have a preferred dimension and/or shape to facilitate desired rate, shape, or pattern of extrusion of the material at the outlet 62. In use, the lower lip 232 can be adjacent to the lower lip 132 of first body 100. The lower lip 132 and the lower lip 232 can define the material outlet 62. The particular shapes and dimensions of the lower lips 132 and 232 can control the extrusion rate, shape, and/or pattern of the material being moved through the outlet 62. The components of the nozzle assembly 50 can be held together with a plurality of fasteners.

The upper surface 220 of the second body 200 is configured to contact the lip surface 156 of the first body 100. During operation, heat is transferred from the heater 11 in the housing 14 to the nozzle assembly 50. In some aspects, heat is transferred to the first body 100, which can then transfer the heat to the second body 200. In such aspects, the second body 200 does not receive heat directly from the housing 14, but rather via engagement with the first body 100. During use, the second body 200 contacts the first body 100 along the respective inner surfaces 228 and 128. Heat can be transferred from the inner surface 128 of the first body 100 to the inner surface 228 of the second body 200. In some aspects, heat can also be transferred from the lip surface 156 of the upper lip 152 of the first body 100 to the upper surface 220 of the second body 200 that is in contact with the lip surface 156.

The dispensing material is received from the housing 14 into the nozzle assembly 50 at an inlet, or channel inlet, 144. In some aspects, the inlet 144 may be defined on the upper surface 120 of the first body 100. A material channel 140 extends along a portion of the first body 100. The channel 140 is configured to receive the material at the material inlet 144 and move the material therethrough toward a channel outlet 148. The channel outlet 148 can be defined on the inner surface 128. Thus, material that is received into the channel inlet 144 at the upper surface 120 of the first body 100 and is moved through the channel 140 and out of the channel outlet 148 at the inner surface 128.

The second body 200 includes a channel 240 that extends between a channel inlet 244 and a channel outlet 248. After the material is discharged from the channel outlet 148 of the first body 100, the material can enter the channel inlet 244 of the second body 200. The material can move along the channel 240 and out of the channel outlet 248. It will be understood that the particular shapes and dimensions of the channels 140 and 240 can be dimensioned according to desired dispensing parameters, and that this disclosure is not limited by particular shapes, sizes, and/or orientations of the individual channels 140 and/or 240. In some aspects, at least a portion of the material may flow between the inner surface 128 of the first body 100 and the inner surface 228 of the second body 200 in a space 54 defined between the inner surfaces 128 and 228.

In some aspects, one or more shims 300 (see FIG. 8) may be defined in the space 54. The one or more shims 300 can be configured to form desired layers and/or patterns to the extruded material. This disclosure is not limited by the presence or absence of shims or by any specific characteristics of any shims present.

During operation, the second body 200 may be moved relative to the first body 100 to set the desired characteristics of the extrudate material that will flow out of the outlet 62. As such, the second body 200 has to be movable relative to the first body 100. In some scenarios, such relative movement can interfere with proper alignment of the first body 100 relative to the housing 14 when the material is being discharged into the nozzle assembly 50. This can result in inaccurate and/or imprecise application of material onto the substrate. Accordingly, the embodiments of nozzle assemblies 50 disclosed throughout this application overcome such problem of poor alignment.

As shown in FIGS. 1 and 2, the nozzle assembly 50 can be held in contact with the housing 14 of the applicator assembly 10. As shown in the figures, the housing 14 can include a plurality of walls 26 that define a recess 30 between the plurality of walls 26. The nozzle assembly 50 can be removably received into the recess 30 and secured accordingly to the housing 14 for use. The nozzle assembly 50 should be aligned relative to the housing 14 such that the one or more outlets 22 on the housing 14 are in axial alignment (e.g., along the first axis A) with respective one or more channel inlets 144 on the nozzle assembly 50.

Figure 3:
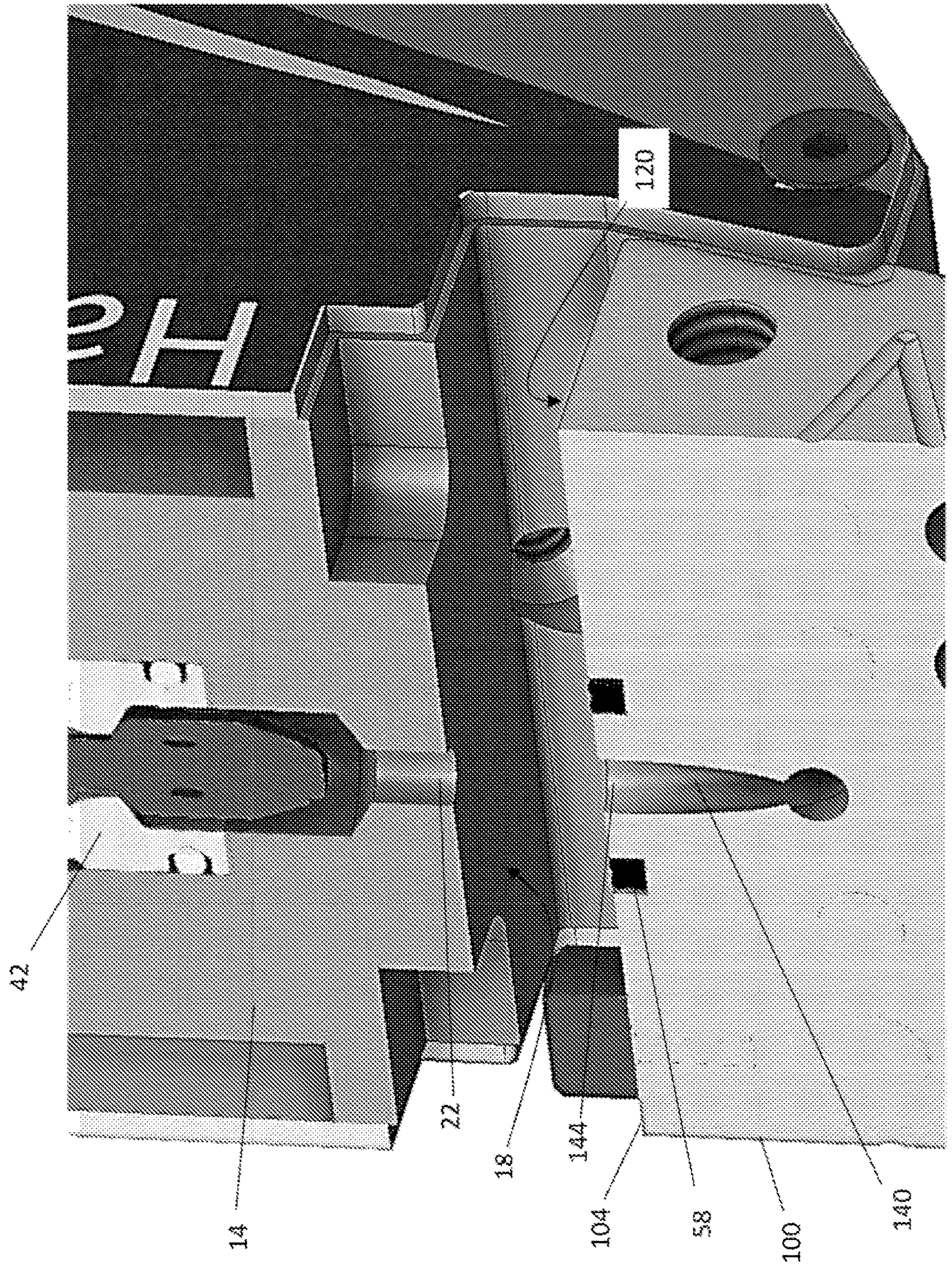
FIG. 3 depicts a cross-sectional view of a portion of the applicator assembly of FIG. 1 with a nozzle assembly spaced from a housing.
Figure 4:
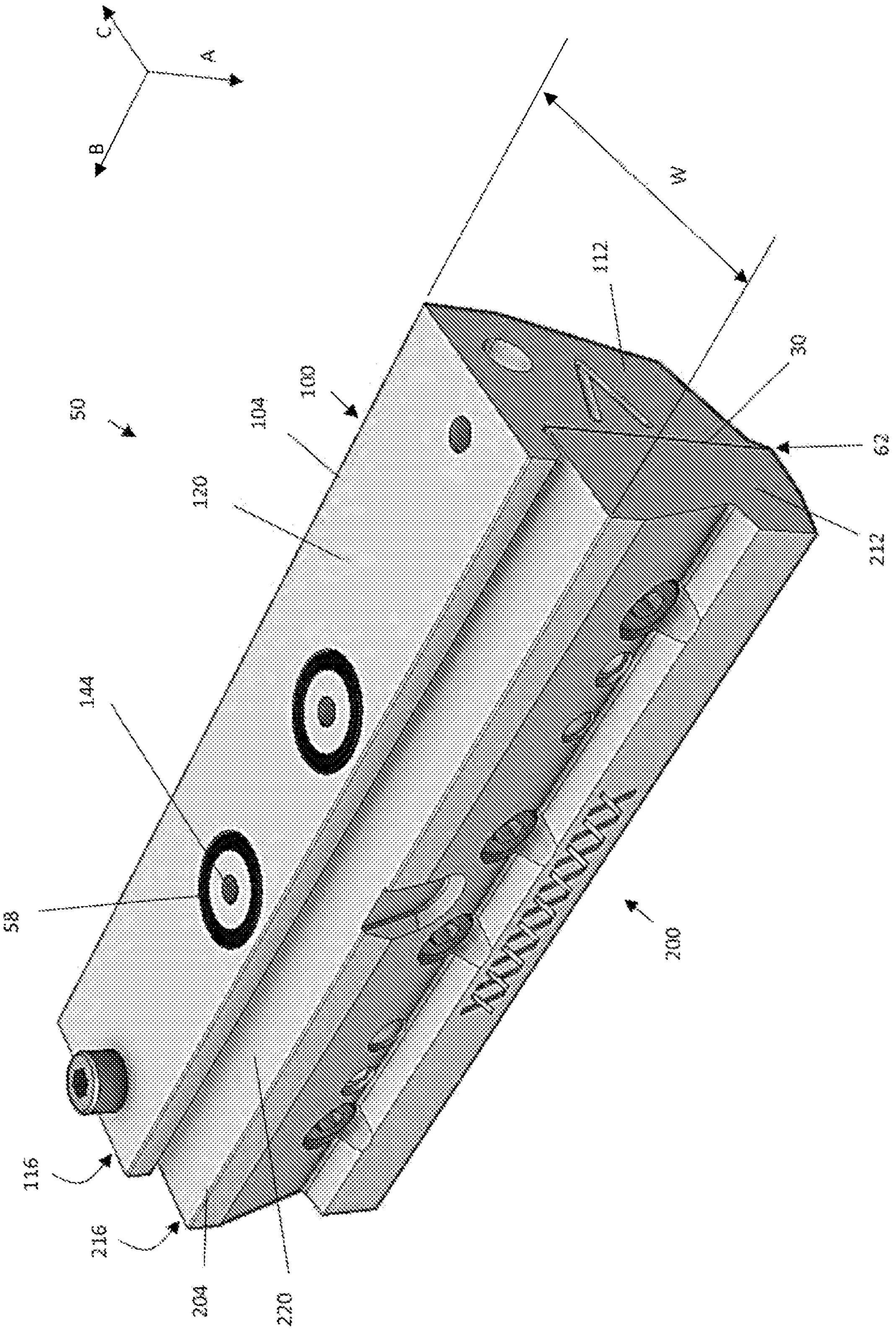
FIG. 4 depicts an isometric view of a nozzle assembly according to an aspect of this disclosure.
Figure 5:
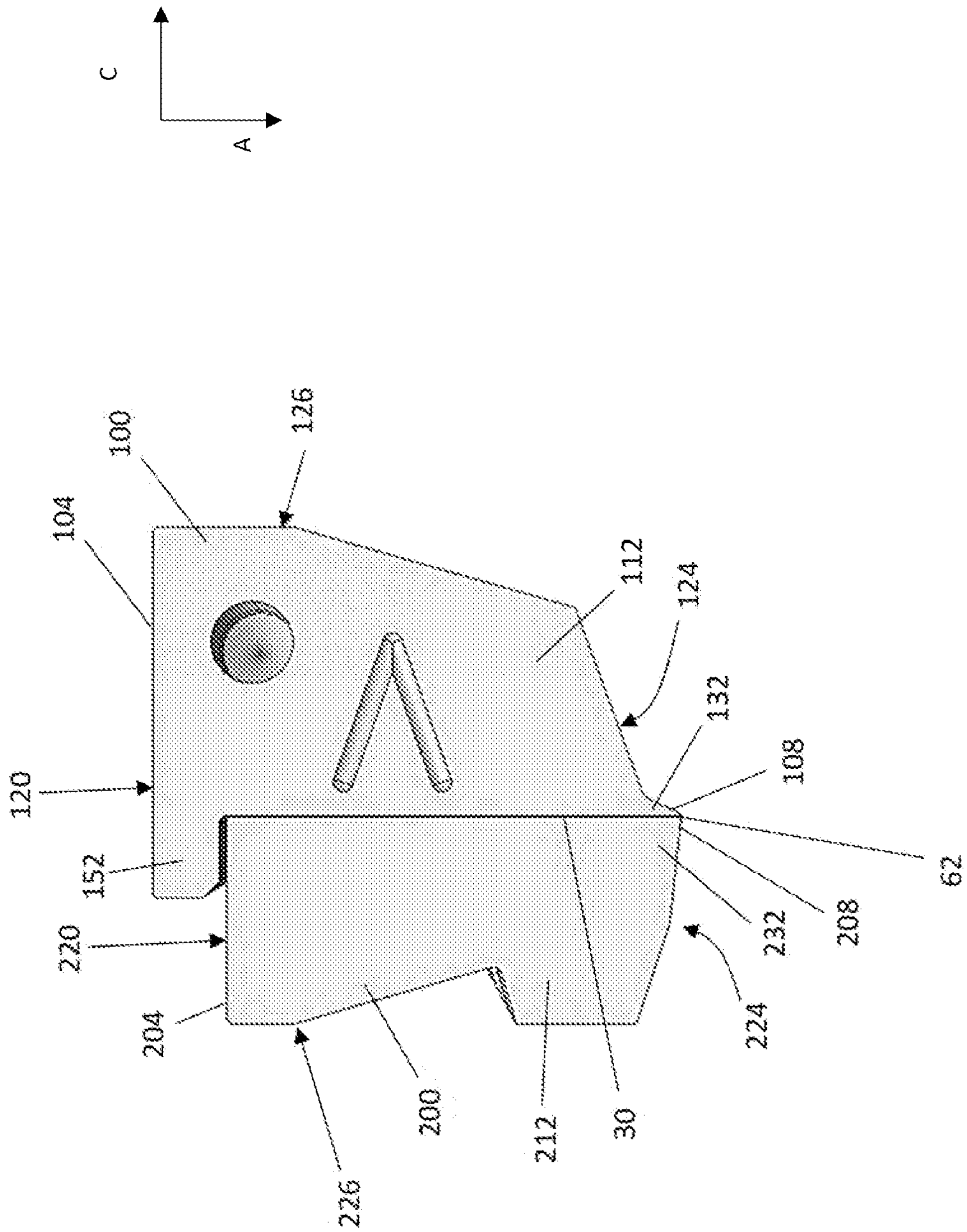
FIG. 5 depicts a side view of the nozzle assembly of FIG. 4.
Figure 6:
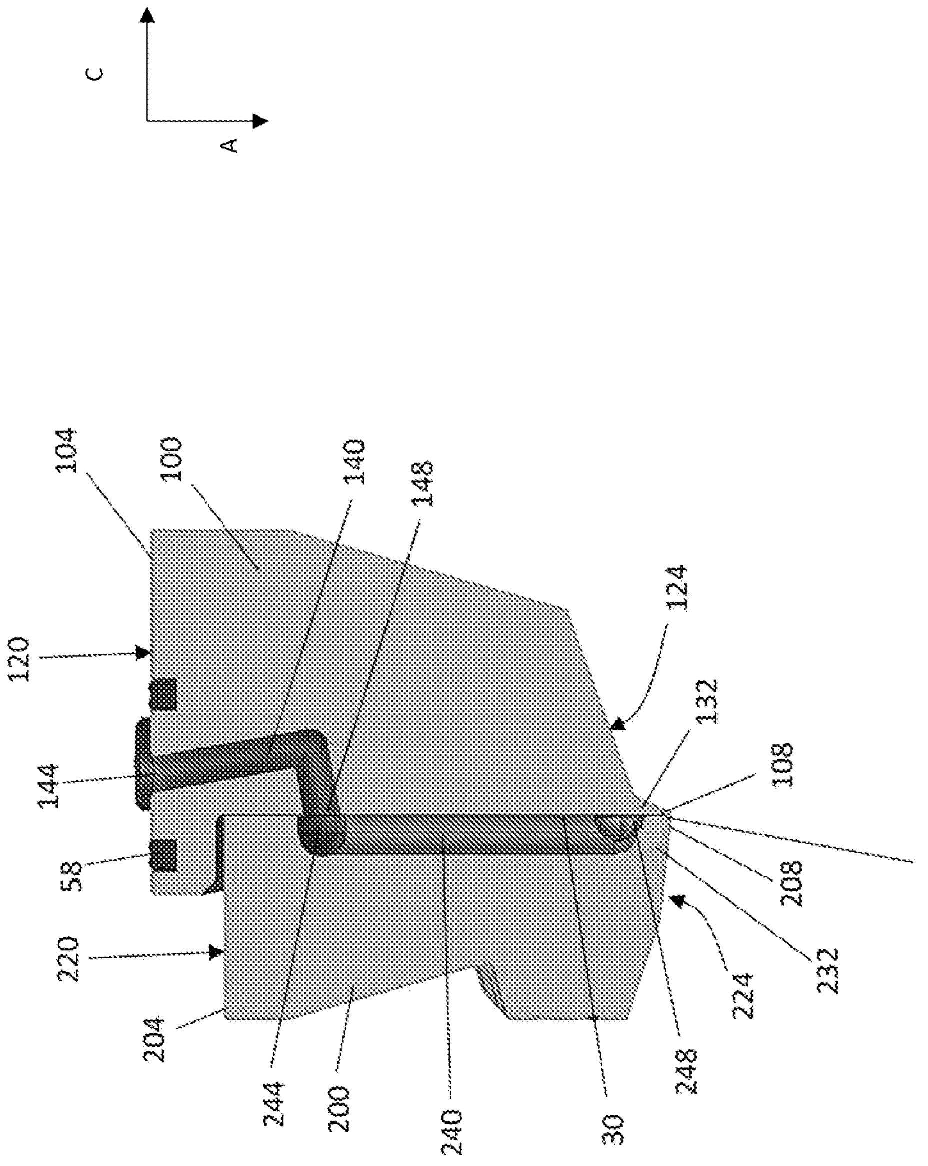
FIG. 6 depicts a side cross-sectional view of the nozzle assembly of FIG. 4.

During operation, the material is forcefully moved under pressure from the dispensing assembly 34, out through the outlet 22, and into the nozzle assembly 50 through the channel inlet 144. The pressure acting on the material can originate from the dispensing assembly 34. This pressure continues to act on the material as the material is moved into and through the nozzle assembly 50. Accordingly, the pressure parameters acting on the material also affect the dispensing of the material out of the nozzle assembly 50 onto the substrate 12. To ensure that the desired pressure is maintained when the material is moved to the nozzle assembly 50, as well as to ensure that the material travels where it is intended, the nozzle assembly 50 can held in contact with the housing 14. Specifically, the nozzle assembly 50 can be held in contact with a dispensing surface 18 of the housing 14, on or through which the one or more outlets 22 are defined (labeled in FIG. 3, showing a cross-sectional view of a portion of the nozzle assembly 50 spaced from the housing 14). In some aspects, the nozzle assembly 50 may be forcefully held against the dispensing surface 18 along the first axis A toward the housing 14.

Preferably, the surface of the nozzle assembly 50 that contacts the dispensing surface 18 is substantially planar and is parallel to the dispensing surface 18. This can ensure that minimal spacing is defined between the nozzle assembly 50 and the dispensing surface 18 adjacent the material outlets 22 and the channel inlets 144. The absence of spacing reduces that risk of material being trapped between the housing 14 and the nozzle assembly 50 when the material exits that housing 14 at the outlet 22. The absence of spacing can also help reduce accumulation of air or other gas between the nozzle assembly 50 and the housing 14. If excess space is defined between the housing 14 and the nozzle assembly 50, then air can become trapped therein and become selectively pressurized and depressurized in response to the pressurized flow of material. For example, during operation, the movement of material from the dispensing assembly 34 into the nozzle assembly 50 can be intermittent and can be controlled by appropriate valve structures in the dispensing assembly 34. When material is permitted to flow, the material is moved under pressure towards the nozzle assembly. At this time, air that is caught in the spaces between the nozzle assembly 50 and the dispensing surface 18 can likewise be compressed due to the pressurized flow of material. When material is precluded from flowing, pressurized forces are no longer acting on the air trapped in the space between the nozzle assembly 50 and the dispensing surface 18, which allows the compressed air to expand. This expansion acts on the material in the nozzle assembly 50 and forces the material towards the nozzle assembly outlet 62. This can result in excess depositing of material onto the substrate 12 and/or in depositing of material at times where such deposition is not desired.

Figure 9A:
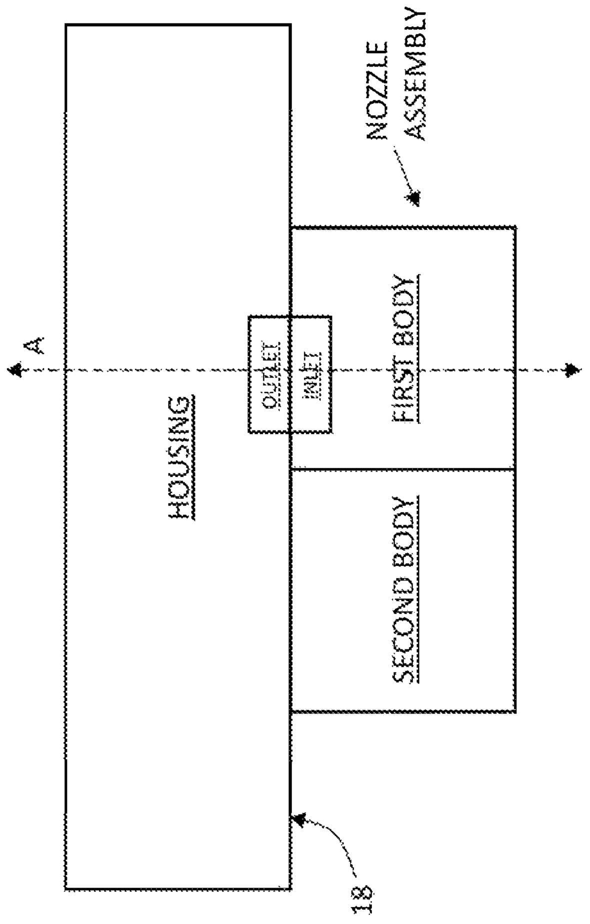
FIG. 9A depicts a schematic of a possible alignment of an applicator assembly.
Figure 9B:
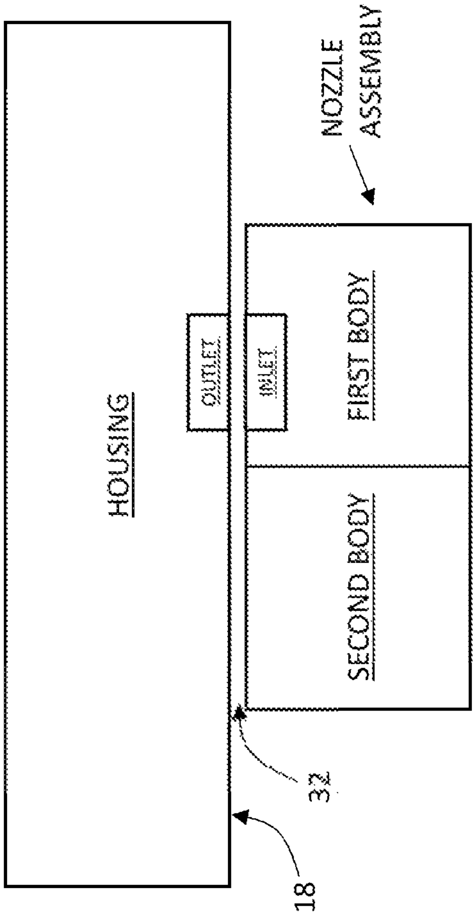
FIG. 9B depicts a schematic of another possible alignment of an applicator assembly.
Figure 9C:
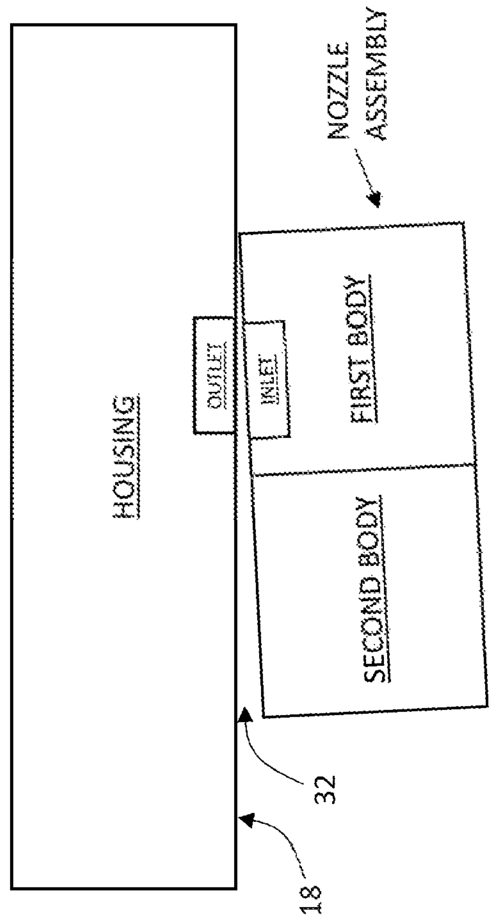
FIG. 9C depicts a schematic of yet another possible alignment of an applicator assembly.

The space between the nozzle assembly 50 and the housing 14 can be caused by improper connection of the nozzle assembly 50 to the housing 14. In some aspects, the space can be caused by movement of one or more components of the nozzle assembly 50, for example, the second body 200 relative to the first body 100. FIGS. 9A-9C depict schematics showing possible alignments and misalignments that can result in a space 32 between a nozzle assembly and a housing of an applicator assembly. It will be appreciated that the figures are not drawn to scale and do not depict all components of the referenced applicator systems. FIG. 9A shows an alignment of a nozzle assembly relative to a housing. The nozzle assembly contacts the dispensing surface 18 of the housing without defining a substantial space 32 in between. The material outlet of the housing is shown axially aligned, along the first axis A, with the channel inlet of the nozzle assembly. FIG. 9B depicts a scenario where a nozzle assembly is spaced from a housing along the first axis A so as to define a space 32 in between. Air can become trapped in the space 32 during operation and adversely affect application of the material. FIG. 9C depicts yet another scenario where a nozzle assembly is partly in contact with the dispensing surface 18 of the housing and partly spaced from the dispensing surface 18 along the first axis A. This misalignment can be the result of movement of one or more components of the nozzle assembly, such as a first body or a second body as shown, and can result in undesirable application parameters of the material.

Figure 9D:
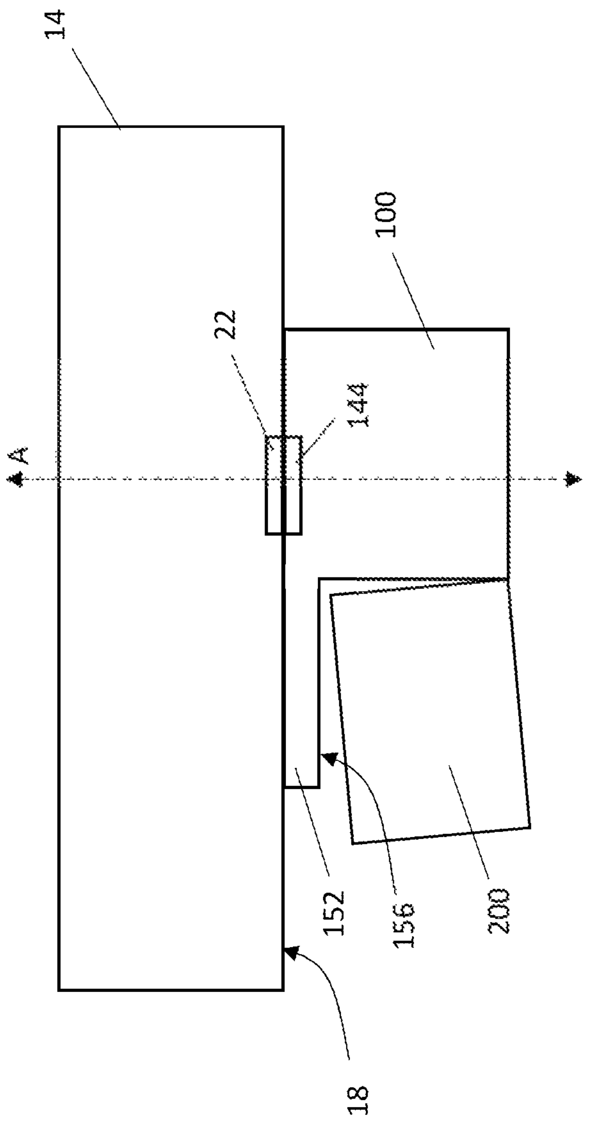
FIG. 9D depicts a schematic of an alignment of an applicator assembly according to an aspect of this disclosure.

FIG. 9D depicts a comparable schematic showing a nozzle assembly 50 according to an embodiment of this disclosure. In some aspects, during operation, the second body 200 can be moved relative to the first body 100. Such movement can result in formation of a space between the upper surface 220 of the second body 200 and the lip surface 156 of the upper lip 152 of the first body 100. However, movement of the second body 200 does not result in formation of a space 32 between the upper surface 120 of the first body 100 and the dispensing surface 18 of the housing. Such movement also does not result in misalignment of the outlet 22 of the housing relative to the channel inlet 144 on the first body 100.

Figure 10A:
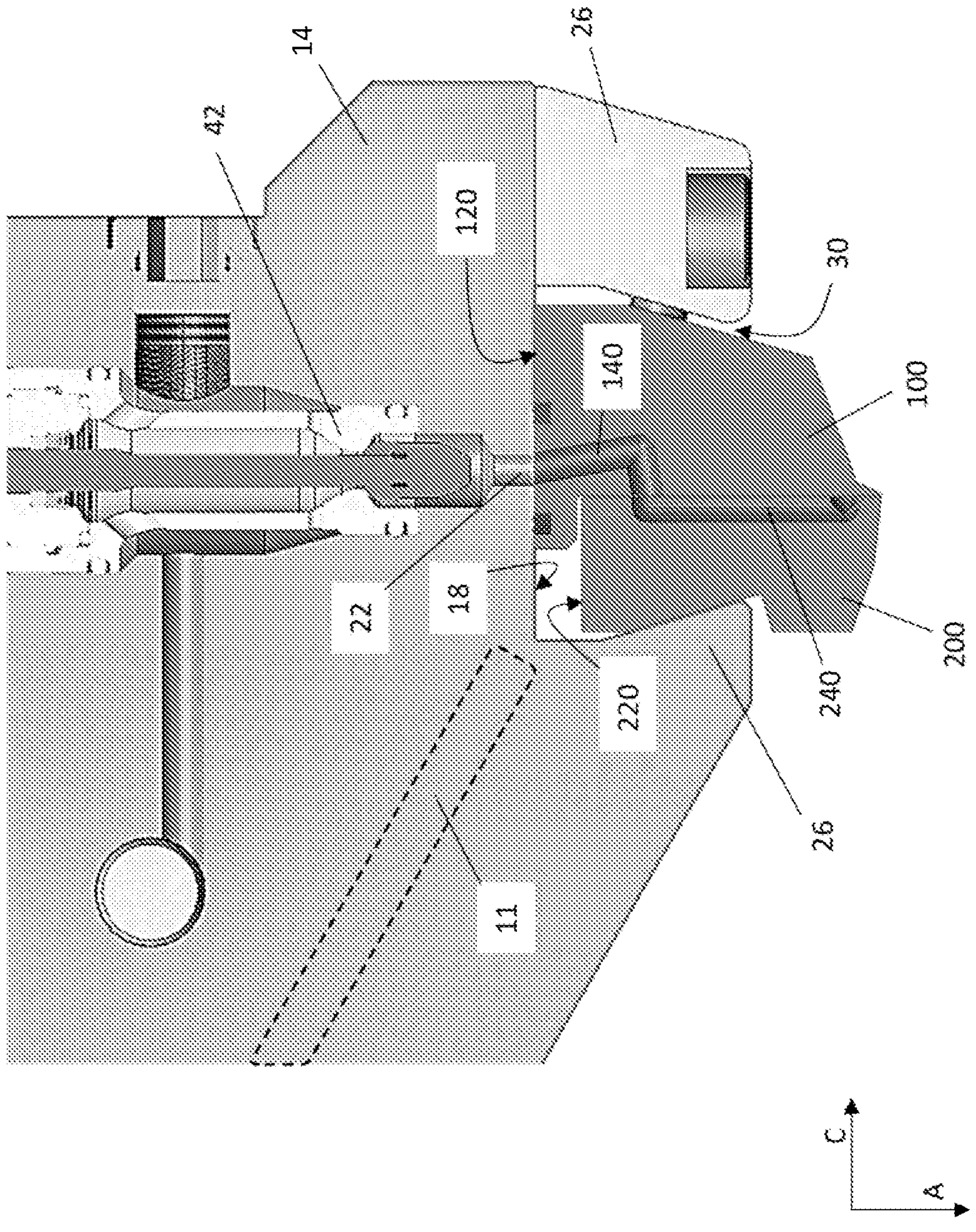
FIG. 10A depicts a cross-sectional side view of an applicator assembly in a first configuration according to an aspect of this disclosure.
Figure 10B:
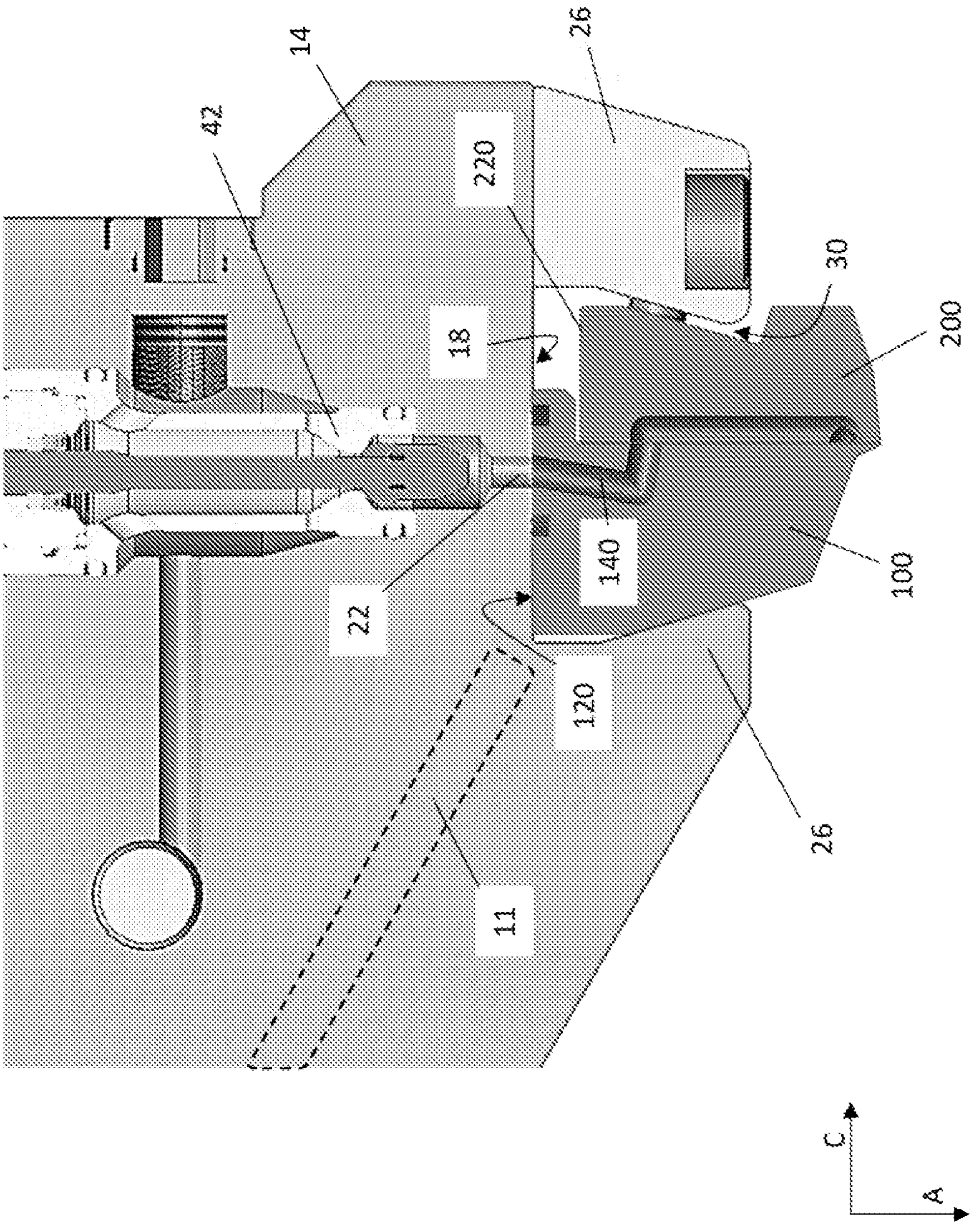
FIG. 10B depicts a cross-sectional side view of the applicator assembly of FIG. 10B in a second configuration according to an aspect of this disclosure.

Embodiments of nozzle assemblies 50 disclosed in this application overcome this problem by retaining the contact surfaces between the nozzle assembly 50 and the dispensing surface 18 on the housing 14 as substantially constant and in fully desired contact during operation regardless of movement of the second body 200 relative to the first body 100. As shown in FIGS. 10A and 10B, the upper surface 120 of the first body 100 is configured to contact the dispensing surface 18 of the housing 14. The one or more channel inlets 144 that receive the material from the outlet 22 are disposed on the upper surface 120. The second body 200, however, does not directly contact the dispensing surface 18. Instead, the upper surface 220 of the second body 200 is configured to contact the lip surface 156 of the upper lip 152 of the first body 100. Thus, the second body 200 does not contact the dispensing surface 18 at all. During operation, any movement of the second body 200 relative to the first body 100 does not affect the contact between the upper surface 120 of the first body 100 and the dispensing surface 18 of the housing 14. This allows the nozzle assembly 50 to be retained relative to the housing 14 in the desired alignment and contact that is not changed due to movements of the second body 200.

In some aspects, the nozzle assembly 50 can be reversibly connected to the housing 14. That is, the nozzle assembly 50 can be disposed in a first configuration within the space 30 between the walls 26 of the housing 14 such that the first body 100 faces away from the second body 200 in a first direction along the third axis C (see FIG. 10A). That is, the nozzle assembly 50 can be disposed in the space 30 between the two walls 26 such that the first body 100 is positioned between the second body 200 and one of the two walls 26. Alternatively, the nozzle assembly 50 can be disposed in a second configuration, in which the first body 100 faces away from the second body 200 in a second direction along the third axis C opposite the first direction (see FIG. 10B). That is, the nozzle assembly 50 can be disposed in the space 30 between the two walls 26 such that the first body 100 is positioned between the second body 200 and the other of the two walls 26. Thus, the nozzle assembly 50 can be substantially rotated 180 degrees around a direction along the first axis A between the first and second configurations.

This allows for greater flexibility in utilizing the applicator assembly 10 in work areas with limited space. In some aspects, the applicator assembly 10 may not fit so as to have the nozzle assembly 50 in a first configuration. In such aspects, the nozzle assembly 50 can be placed in the second configuration, and the applicator assembly 10 can be oriented in an opposite direction. This can allow for application of the material onto the substrate 12 to not change while changing the relative positioning of other components of the applicator assembly 10.

Whether the nozzle assembly 50 is in the first or second configuration, the material must still be received into the one or more channel inlets 144 from the outlets 22 on the housing 14. Referring again to FIGS. 10A and 10B, each channel inlet 144 can be arranged at the midpoint of the nozzle assembly 50, measured along the third axis C. This allows the channel inlet 144 to be axially aligned with the outlet 22 on the housing 14 when the nozzle assembly 50 is in the first configuration and also when the nozzle assembly 50 is in the second configuration. The nozzle assembly 50 can define a width measured along the third axis C. The width can be measured between a first point on the first body 100 and a second point on the second body 200. For example, the first body 100 may define an outer surface 126 (labeled in FIG. 5) spaced from the inner surface 128 along the third axis C away from the second body 200. The second body 200 may define an outer surface 226 (labeled in FIG. 5) spaced from the inner surface 228 along the third axis C away from the first body 100. The nozzle assembly 50 may have a width W (labeled in FIG. 4) measured from a first point on the outer surface 126 of the first body 100 and a second point on the outer surface 226 of the second body 200 that is spaced from the first point along the third axis C.

When the nozzle assembly 50 is in the first configuration, as shown in FIG. 10A, for example, the channel inlet 144 can be disposed at a first distance from one of the walls 26 that define the recess 30 of the housing 14. The first distance can be measured along the third axis C. When the nozzle assembly 50 is in the second configuration, as shown in FIG. 10B, for example, the channel inlet 144 is still disposed at the same first distance from the same one of the walls 26. By placing the channel inlet 144 on the nozzle assembly 50 such that the channel inlet 144 is always the same distance away from a reference point allows the nozzle assembly 50 to be rotated 180 degrees between the first and second configurations without having to reconfigure the connection between the channel inlet 144 and the outlet 22 on the housing 14. It should be understood that in embodiments having a plurality of channel inlets 144 configured to connect to respective outlets 22, all of the channel inlets 144 can be disposed such that they can be placed into the desired alignment with their respective outlets 22 when the nozzle assembly 50 is in either of the first or second configurations.

While systems and methods have been described in connection with the various embodiments of the various figures, it will be appreciated by those skilled in the art that changes could be made to the embodiments without departing from the broad inventive concept thereof. It is understood, therefore, that this disclosure is not limited to the particular embodiments disclosed, and it is intended to cover modifications within the spirit and scope of the present disclosure as defined by the claims.

What is claimed:

1. An applicator assembly for dispensing a material onto a substrate, the applicator assembly comprising:
- a housing;
- a dispensing assembly configured to receive the material therein; and
- a nozzle assembly configured to receive the material from the dispensing assembly at a material inlet and to discharge the material out of the nozzle assembly through a material outlet, the nozzle assembly comprising:
  - a first body having an upper surface and an inner surface angularly offset from the upper surface;
  - a first channel extending through the first body, the first channel configured to receive the material therein;
  - a second body having an upper surface and an inner surface angularly offset from the upper surface;
  - a second channel extending through the second body, the second channel being in liquid communication with the first channel and configured to receive the material therein from the first channel; and
  - an upper lip extending from the first body toward the second body, the upper lip being partly defined by the upper surface of the first body, and the upper lip including a lip surface opposite the upper surface of the first body,
- wherein the material outlet is defined by the first body and the second body,
- wherein the material inlet is defined on the upper surface of the first body and is in liquid communication with the first channel,
- wherein the upper surface of the second body is configured to contact the lip surface of the upper lip of the first body,
- wherein the housing includes a first wall extending therefrom and a second wall extending therefrom spaced from the first wall, the housing defining a space between the first and second walls, and
- wherein the nozzle assembly is configured to be received in the space defined between the first and second walls.

2. The applicator assembly of claim 1, further comprising a heater configured to heat the material in the applicator assembly.

3. The applicator assembly of claim 2, wherein the heater is configured to apply heat to the first body of the nozzle assembly.

4. The applicator assembly of claim 3, wherein the second body of the nozzle assembly is configured to receive heat through the first body of the nozzle assembly and does not receive heat directly from the heater.

5. The applicator assembly of claim 1, wherein the material includes a thermoplastic polymer.

6. The applicator assembly of claim 1, wherein the material includes an adhesive.

7. The applicator assembly of claim 1, wherein an upper housing of the first body is configured to contact the housing, and the upper surface of the second body is precluded from contacting the housing.

8. The applicator assembly of claim 1, wherein the applicator assembly has a first configuration and a second configuration, wherein when the applicator assembly is in the first configuration, the nozzle assembly is disposed in the space such that the first body of the nozzle assembly is disposed between the second body and the first wall of the housing, and when the applicator assembly is in the second configuration, the nozzle assembly is disposed in the space such that the first body of the nozzle assembly is disposed between the second body and the second wall of the housing.

9. The applicator assembly of claim 1, further comprising:

a sealing element on the upper surface of the first body adjacent the material inlet; and a shim disposed between the first body and the second body, the shim being configured to contact the inner surface of the first body and the inner surface of the second body.

10. The applicator assembly of claim 1, wherein the second body is movable relative to the first body, wherein the upper surface of the second body is movable relative to the lip surface of the upper lip of the first body, wherein the first body includes an outer surface spaced from the inner surface of the first body along a lateral direction away from the second body, the second body includes an outer surface spaced from the inner surface of the second body along the lateral direction away from the first body, and the nozzle assembly defines a width measured between a first point on the outer surface of the first body and a second point on the outer surface of the second body along the lateral direction, and wherein the material inlet is disposed on the upper surface of the first body at a midpoint of the width.

11. The applicator assembly of claim 1, further comprising a sealing element on the upper surface of the first body adjacent the material inlet.

12. The applicator assembly of claim 1, further comprising a shim disposed between the first body and the second body, the shim being configured to contact the inner surface of the first body and the inner surface of the second body.

13. The applicator assembly of claim 1, further comprising a plurality of material inlets disposed on the upper surface of the first body.

14. The applicator assembly of claim 13, further comprising a shim disposed between the first body and the second body, the shim being configured to contact the inner surface of the first body and the inner surface of the second body.

15. The applicator assembly of claim 1, further comprising a plurality of shims disposed between the first body and the second body, wherein at least one of the plurality of shims is configured to contact the inner surface of the first body, and another of the plurality of shims is configured to contact the inner surface of the second body.

16. The applicator assembly of claim 1, wherein the material outlet comprises a lower lip at a distal end of the first body and a lower lip at a distal end of the second body.

17. The applicator assembly of claim 1, wherein the material outlet comprises the inner surface of the first body and a bottom surface of the first body configured to define a lower lip at a distal end of the first body; and wherein the material outlet further comprises the inner surface of the second body and a bottom surface of the second body configured to define a lower lip at the distal end of the second body.

18. The applicator assembly of claim 1, wherein the first body and the second body are configured to operate in a first configuration in the applicator assembly and the first body and the second body are configured to operate in a second configuration in the applicator assembly; and wherein the first configuration arranges the first body and the second body 180 degrees with respect to the applicator assembly from the second configuration.

* * * * *